United States Patent Office 3,135,732
Patented June 2, 1964

3,135,732
AZO DYESTUFFS
Karl-Heinz Schündehütte, Leverkusen, Horst Nickel, Cologne-Stammheim, Karl-Heinz Schmidt, Cologne-Flittard, and Fritz Suckfüll, Leverkusen, Germany, assignors to Farbenfabriken Bayer Aktiengesellschaft, Leverkusen, Germany, a corporation of Germany
No Drawing. Filed Jan. 12, 1960, Ser. No. 1,881
Claims priority, application Germany Jan. 14, 1959
4 Claims. (Cl. 260—157)

The present invention relates to valuable azo dyestuffs; more particularly it relates to azo dyestuffs of the formula

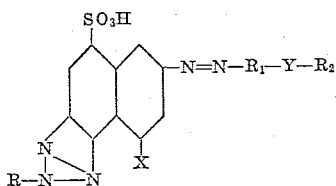   (I)

In this formula R means the residue of an aromatic diazo compound, X stands for hydrogen or a sulfonic acid group, $R_1$ denotes a carbocyclic nucleus bearing the azo bridge and Y in the p-position to each other, Y means one of the bridge members —N=N—,

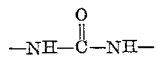

2,4-triazinyl-[1,3,5]-amino,

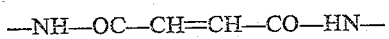

and terephthaloylamino, and $R_2$ stands for the residue of a carbocyclic or heterocyclic component.

The new dyestuffs are obtainable by coupling 2,5-diamino-naphthalene-4,8-di- or -8-monosulfonic acid with an aromatic diazo compound in o-position to the 5-positioned amino group, triazolizing the dyestuff obtained, further diazotising, coupling with a carbocyclic amino compound in p-position to the amino group and transforming in the dyestuff obtained the end-positioned amino group into a bridge member —N=N—,

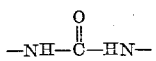

—HN—CO—CH=CH—CO—NH—, a 2,4-triazinyl-[1,3,5]-amino- or terephthaloylamino radical.

Aromatic diazo compounds suitable for the process for the first coupling are accessible by diazotising aromatic amino or aminoazo compounds for example, aminobenzene, 1-aminobenzene-4-sulfonic acid, aminobenzene carboxylic acids, aminonaphthalene sulfonic acids, 4-aminoazobenzene-4'-sulfonic acid, 4-aminoazobenzene-3,4'-disulfonic acid, dehydro thiotoludine-disulfonic acid and the like.

The triazolisation is carried out according to processes known as such for example by oxidation with ammoniacal cupric salt solutions or with hypochlorite.

For the second coupling suitable carbocyclic amines which couple in the p-position to the amino group are for example 1-amino-3-methylbenzene, amino-methoxybenzenes, 2-amino-benzoic acid, 1-aminonaphthalene, 1-aminonaphthalene-2-sulfonic acid, 2-bromo-1-aminonaphthalene-6-sulfonic acid and 2-ethoxy-1-aminonaphthalene-6-sulfonic acid.

The transformation of the end-positioned amino group in the dyestuff of the general formula

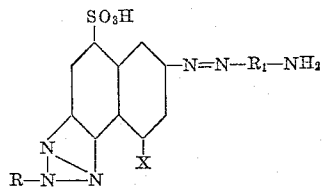   (II)

wherein X, R and $R_1$ have the same significance as mentioned above, into a bridge member Y of the above-indicated meaning can, for example, be carried out by:

(a) Acylation of (II) with polyfunctional acylation agents such as phosgene, cyanuric chloride, fumaric acid dichloride or terephthalic acid dichloride, whereby symmetrical dyestuffs or, in the case where a second amino compound $R_2$ of different structure is used, unsymmetrical dyestuffs are obtained;

(b) Further diazotization of the compound (II), coupling with a coupling component in o-position to a hydroxyl group and, if desired, transformation of the o-hydroxyazo dyestuff into a metal complex compound, preferably copper complex compound; or (c) Further diazotization of the amino group-containing compound (II), coupling with a coupling component in o-position to an amino group and transformation of the o-aminoazo dyestuff into a triazole compound;

(d) Further diazotization of the amino group-containing compound (II), coupling with a carbocyclic amine in p-position to the amino group, further diazotisation and coupling with a coupling component in o-position to an amino group, and transformation of the o-aminoazo dyestuff thus obtained into a triazole compound.

The reaction of the azo compounds of the Formula II with polyfunctional acylation agents (process (a)) is carried out according to known processes in aqueous solution in the presence of acid-binding agents such as sodium carbonate. In the production of unsymmetrical dyestuffs, colored or uncolored compounds can be introduced as the second amino component $R_2$.

Coupling components suitable for the further diazotisation, coupling and, if desired, subsequent metal complex formation (process (b)) which couple in the o-position to a hydroxyl group are for example 1-hydroxy-4-methylbenzene, p-hydroxybenzyl-sulfonic acid, 1-hydroxynaphthalene-4-sulfonic acid, 2-hydroxynaphthalene-3,6-disulfonic acid, 1-phenyl-3-methyl-5-pyrazolone as well as azo group-containing coupling components such as the monoazo dyestuff from diazotised 1-chloro-2-amino-5-benzenesulfonyl - hydroxynaphthalene-7-sulfonic acid and 2-hydroxynaphthalene-3,6-disulfonic acid (saponified) among others.

The metal free dyestuffs obtained according to process (b) correspond to the formula

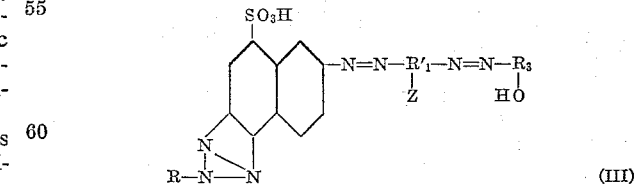   (III)

wherein $R'_1$ represents the residue of a carbocyclic amine in which the azo bridges stand in p-position to each other, $R_3$ represents the residue of a coupling component which may contain further azo groups and Z is a group forming a metal complex such as a hydroxyl or carboxy group, or a substituent being transformable into such a group, such as a lower alkoxy group, Z and OH standing in o-position, to the external azo bridge.

The metallisation of these dyestuffs may be carried out according to known processes. If Z in o-position to the external azo group represents a hydroxy or carboxyl group the complex formation occurs immediately by the action of the metal salt concerned, for example a nickel or copper salt. If Z stands for an alkoxy group or a halogen substituent, this can be replaced for example with Fehling's solution with formation of a complex bound hydroxyl group. Finally, hydrogen atoms or sulfonic acid groups (Z) standing in o-position to the azo group can be transformed into copper complex bound hydroxyl groups according to the processes of oxidising coppering e.g. according to German patent specifications 807,289, 889,196, 893,699 and 1,006,098.

By coupling with coupling components in o-position to an amino group and subsequent triazolisation according to the process (c), dyestuffs result of the general formula

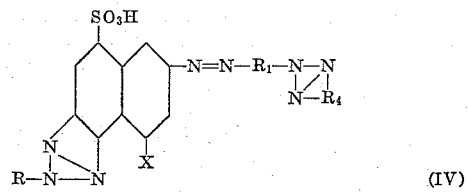

(IV)

wherein $R_4$ represents the residue of a carbocyclic amine in which the nitrogen atoms of the triazole ring are in o-position to one another, and R, $R_1$ and X have the above significance.

Coupling components $R_4$ suitable for this purpose are for example 1-aminonaphthalene-4-sulfonic acid, 2-aminonaphthalene-3-carboxylic acid, 2-aminonaphthalene-6-sulfonic acid, 2-aminonaphthalene-5,7-disulfonic acid. The triazolisation can be carried out in the same way as the triazolisation which follows the first coupling.

If the diazotised aminotriazole component of the Formula II is first coupled with a carbocyclic amino compound in p-position to the amino group, then further diazotised and coupled with an amino-group-containing carbocyclic compound dyestuffs of the following general structure are producible

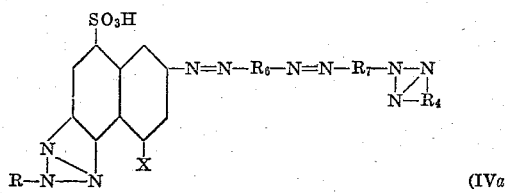

(IVa)

wherein R, X and $R_4$ have the above significance and $R_6$ and $R_7$ stand for carbocyclic nuclei, $R_6$ having the azo bridges and $R_7$ having the azo bridge and triazole grouping in p-position to each other.

The same dyestuffs as are obtained by the processes (a), (b), (c) or (d) may be produced when starting from 2-acylamino-5-aminonaphthalene-4,8-di- or -8-monosulfonic acid and, after the first coupling in the 6-position and triazolisation, splitting off the acyl group and otherwise proceeding in the same manner as described above.

Further embodiments of producing the new dyestuffs consist in varying the sequence of the various process steps. Thus, for example, 2-amino- or 2-acylamino-5-aminonaphthalene-4,8-di- or -8-monosulfonic acid can be coupled with the diazo compound $$R-\overset{(+)}{N}\equiv N$$

then first further diazotising the amino groups in 2-position (if desired after hydrolysis of the acylamino group) for example in weakly acid medium, then coupling with the carbocyclic amino compound $R_1$—$NH_2$ or

in p-position to the amino group, then carrying out the triazolisation at the residue R and finally transforming the amino group in the residue $R_1$ or

according to one of the processes described above, into a nitrogen-containing bridge member. For the purpose of transforming it into a urea group the amino group, instead of being treated with phosgene in the presence of a second component containing an amino group, can be reacted with a urethane, or in reverse order a urethane can first be produced and this reacted with a second amine component.

In the presence of metal complex forming substituents, for example in dyestuffs of the Formula III, the metallising of the dyestuffs can be carried out in various phases of the production process. The metal-containing dyestuffs can furthermore be de-metallized by known processes and the dyeings after-treated on the fibre with metal salts.

Preferred metal complex forming agents are copper, nickel, iron, manganese, chromium and cobalt salts.

In the case where the residues R and $R_2$ in the Formula I possess groups which are capable of further reactions for example nitro groups, which combine with nitro groups of a second component with reductive formation of azo or azoxy groups, or amino groups which can be reacted with mono- or polyfunctional acylating agents, such reactions can be interposed as intermediate steps or carried out after the conclusion of the above-described process.

The new azo dyestuffs are suitable, inter alia, for dyeing vegetable fibres, especially cotton and viscose. The dyeings on these fibres are distinguished by good fastness properties especially good light-fastness and wet-fastness. The following examples are given for the purpose of illustrating the invention without, however, limiting it thereto.

*Example 1*

The solution of 31.8 parts by weight (0.1 mol) of 2,5-diamino naphthalene-4,8-disulphonic acid in 1000 parts by volume of water is treated with 25 parts by weight of sodium acetate and then with the diazo compound from 17.3 parts by weighe of 1-aminobenzene-4-sulphonic acid at 0° C. After the coupling is completed the reaction solution is brought by addition of hydrochloric acid to a pH of 1, the dyestuff separated with 150 parts by weight of sodium chloride and isolated by filtering off with suction.

The paste obtained is dissolved in 1000 parts by volume of hot water and treated with a solution of 56 parts by weight of crystalline copper sulphate in 140 parts by volume of water and 130 parts by volume of 25% aqueous ammonia. Stirring is then continued at 90–95° C. for about 3 hours until triazolisation is terminated. After cooling to room temperature the mixture is acidified with hydrochloric acid, 200 parts by weight of sodium chloride are added and the aminotriazole is isolated.

0.1 mol of the aminotriazole compound are dissolved in weakly soda alkaline in 900 parts by volume of water, treated with 69 parts by volume of a 10% sodium nitrite solution and stirred at 15° C. into a mixture of 42 parts by volume of hydrochloric acid (d. 1.14) and 50 parts by volume water. After the diazotisation is completed a solution of 10.7 parts by weight of 1-amino-3-methylbenzene in 50 parts by volume of water and 15 parts by volume of hydrochloric acid (d. 1.14) are added at 0–3° C. and finally 150 parts by volume of a 20% sodium acetate solution are added. After coupling is completed the reaction product is isolated while acid to Congo red.

The compound obtained is dissolved weakly soda alkaline in 2100 parts by volume water and diazotised by treating with 69 parts by volume of a 10% sodium nitrite solution at 40° C. After diazotisation is completed the isolated diazonium salt is coupled at 0–3° C. with the neutral solution of 22.3 parts by weight of 2-amino-naphthalene-6-sulphonic acid in 600 parts by volume of water and the amino diazo dyestuff subsequently separated.

The paste obtained is dissolved in 1400 parts by volume of hot water, treated with the solution of 56 parts by weight of crystalline copper sulphate in 140 parts by volume of water and 130 parts by volume of a 25% aqueous ammonia and boiled until completion of triazolisation. After separation of the cuprous oxide by filtration— optionally with the addition of animal charcoal—the dyestuff is separated out of a filtrate with sodium chloride and isolated. The dyestuff obtained corresponds in a form of the free acid to the formula

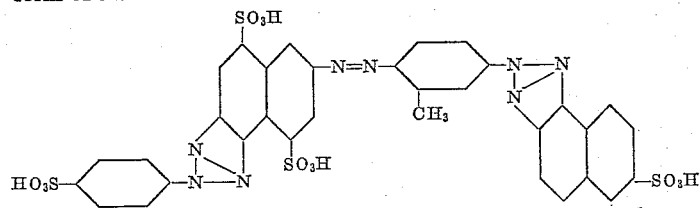

After drying it represents a brown powder which dissolves in water with a yellow colour and dyes cotton in yellow shades with very good fastness properties.

The substitution of 1-aminobenzene-4-sulphonic acid by equivalent quantities of the dehydrothiotoluidine-disulphonic acid, dehydrothiotoluidine-sulphonic acid, 1-aminonaphthalene-4-sulphonic acid, 1-aminonaphthalene-5-sulphonic acid, and 2-aminonaphthalene-6-sulphonic acid leads to dyestuffs which likewise dye cotton in yellow shades.

In an analogous manner to that described in Example 1, 0.1 mol of 2,5-diaminonaphthalene-8-sulphonic acid is coupled with diazotised 1-aminobenzene-3-sulphonic acid, triazolised, coupled with 1-amino-3-methylbenzene and then with 2-aminonaphthalene-6-sulphonic acid and transformed into the triazole. A dyestuff is thus obtained which dyes cotton in yellow shades.

*Example 2*

27.7 parts by weight (0.1 mol) of 4-aminoazobenzene-4'-sulphonic acid are diazotised and as described in Example 1 coupled with the equivalent quantity of 2,5-diaminonaphthalene-4,8-disulphonic acid and then triazolised. The triazole compound obtained is isolated in the form of weakly yellow crystals.

If this triazole compound is diazotised according to a process analogous to that described in Example 1, coupled with 1-amino-3-methylbenzene, again diazotised, coupled with 2-aminonaphthalene-6-sulphnic acid and subsequently triazolised, a dyestuff is obtained which likewise dyes cotton in yellow shades.

If in this example 4-aminoazobenzene-4'-sulfonic acid is substituted by an equivalent quantity of naphthalene-4,8-disulfonic acid-2,4'-azo-1'-amino-3'-methylbenzene or 1-amino-2-methoxy-6-methyl-azobenzene-4'-sulfonic acid or by the coupling product from diazotised naphthalene-6,8-disulfonic acid-2,4'-azo-1'-amino-3'-methylbenzene and 1-amino-3-methylbenzene and the process then follower as described above, a dyestuff is obtained which likewise dyes cotton with yellow to orange shades.

If instead of 1-amino-3-methylbenzene there are used as middle components aminobenzene, 1-amino-2-methoxy-6-methylbenzene, 1-aminonaphthalene or 1-aminonaphthalene-6-sulfonic acid dyestuffs are obtained which dye cotton yellow to orange shades.

*Example 3*

The diazo compound from 34.8 parts by weight (0.1 mol) of 2-amino-6-nitro-naphthalene-4,8-disulfonic acid is coupled analogously to the instructions given in Example 1 with the equivalent quantity of 2,5-diaminonaphthalene-4,8-disulphonic acid and then triazolised. The triazole compound is then, as described in Example 1, coupled with 1-amino-3-methylbenzene, diazotised, coupled with 2-aminonaphthalene-6-sulphonic acid and finally triazolised. The dyestuff of the formula

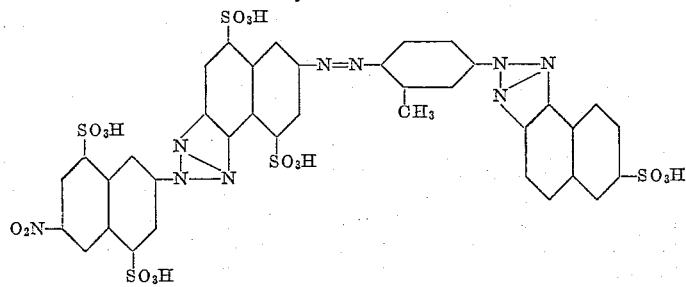

which is obtained dyes cotton in yellow shades.

*Example 4*

0.1 mol of the amino triazole produced according to the method of the first paragraph in Example 2 are coupled with the equivalent quantity of 1-amino-3-methylbenzene; the amino azo compound obtained is then transformed with phosgene in the usual manner into the symmetrical urea of the following formula:

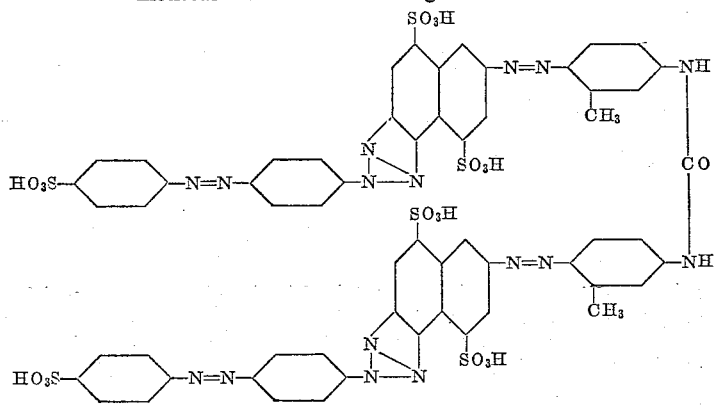

The dyestuff dyes cotton in gold yellow shades. The dyeings are distinguished by good fastness properties.

*Example 5*

0.1 mol of the first-mentioned aminotriazol compound from Example 1 are diazotised and coupled at pH 3–4 with the equivalent quantity of 2-ethoxy-1-aminonaphthalene-6-sulfonic acid. After isolation the aminoazo compound is further diazotised in 1000 parts by volume of water at 20° C. and coupled in bicarbonate-alkaline medium with addition of 100 ml. of pyridine with 2-hydroxynaphthalene-3,6-disulfonic acid. The azo dyestuff obtained is transformed by methods known as such into the copper complex compound, which is a dark powder, which dissolves in water with a green color and dyes cotton in green shades. It corresponds to the formula

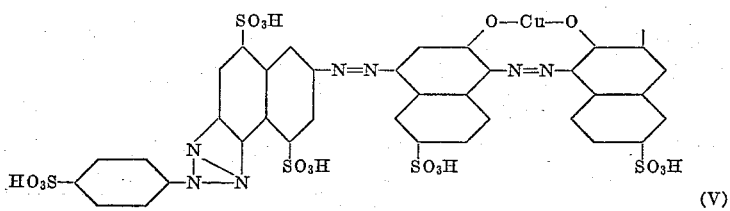

If as end component 2-hydroxynaphthalene-6-sulfonic acid or 1-hydroxynaphthalene-4-sulfonic acid is used dyestuffs are likewise obtained which dye cotton in green shades.

The dyestuffs may be de-coppered according to usual methods and then again metallized either on a substrate or in substance with, for instance, copper-, nickel- or chromium salts.

If the amino triazole compound in this example is replaced by the aminotriazole compound

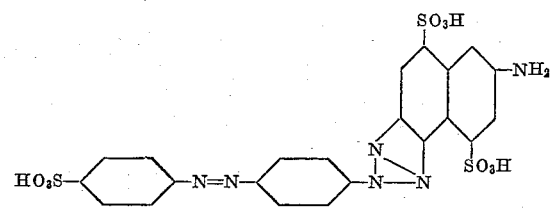

and one proceeds as above, a dyestuff is obtained which dyes cotton in green shades with good light fastness.

If the 2-ethoxy-1-aminonaphthalene-6-sulphonic acid is replaced by 1-aminonaphthalene-6-sulfonic acid, the aminoazo dyestuff thus obtained coupled with 2-hydroxynaphthalene-3,6-disulphonic acid and then transformed into the copper complex dyestuff according to the methods of oxidising coppering, the above described dyestuff (V) is likewise obtained.

If 2-ethoxy-1-aminonaphthalene-6-sulfonic acid is replaced in this example by 2-aminobenzene-1-carboxylic acid and the aminoazo dyestuff obtained is diazotised and coupled in soda-alkaline medium with 1-hydroxynaphthalene-4-sulfonic acid a dyestuff is obtained which dyes cotton in brown shades.

*Example 6*

If 0.1 mol of the aminoazo dyestuff of the formula

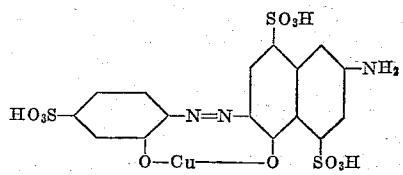

is diazotised as usual, coupled with 2,5-diaminonaphthalene-4,8-disulphonic acid at pH 4–5, triazolised and according to the instructions of Example 2 first coupled with 1-amino-3-methylbenzene and then with 2-aminonaphthalene-6-sulphonic acid and finally triazolised, a (V)

dyestuff is obtained which dyes cotton in brown shades.

If 0.1 mol of the aminoazo dyestuff of the formula

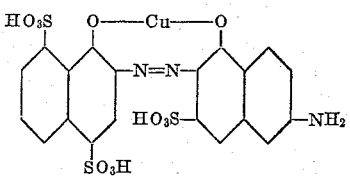

is used as first diazo component and one proceeds otherwise as indicated above a dyestuff is obtained which dyes cotton in grey shades.

*Example 7*

0.1 mol of the diazo compound obtained according to Example 1 of the formula

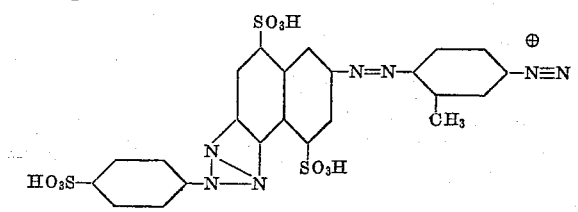

are coupled as usual with 1-amino-3-methyl benzene. The aminodisazo dyestuff obtained is further diazotised at room temperature, coupled with 2-aminonaphthalene-6-sulphonic acid and transformed into the triazole compound. The dyestuff is obtained of the formula

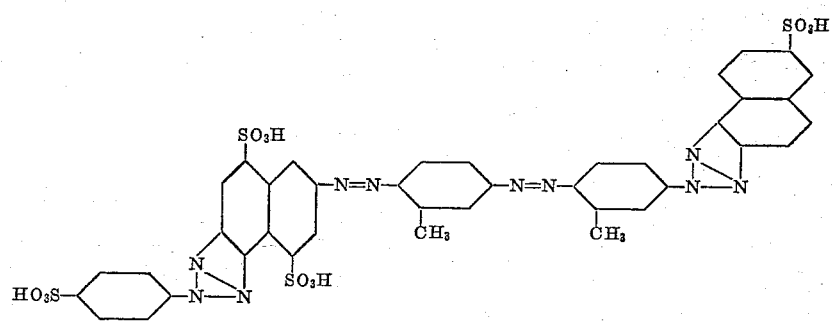

which dyes wool in orange coloured shades.

If the first mentioned triazole component of Example 2 is used in this example a dyestuff is obtained which dyes cotton in orange coloured shades.

We claim:
1. A compound of the formula

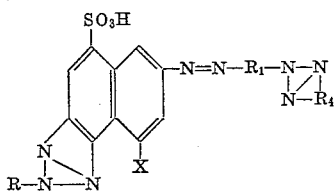

wherein R is the residue of a diazo compound selected from the group consisting of the benzene, azobenzene, naphthalene and dehydrothiotoluidine series; $R_1$ stands for a divalent radical selected from the group consisting of the phenylene, naphthylene and phenylazophenyl series, $R_1$ bearing the two —N— groups in para-position to each other; $R_4$ is the residue of an amine of the naphthalene series and bearing the triazole group on adjacent carbon atoms; X is a member selected from the group consisting of H and $SO_3H$; R containing at least one substituent selected from the group consisting of H, $SO_3H$, COOH, and $OCH_3$; $R_1$ containing at least one substituent selected from the group consisting of H, $CH_3$, $OCH_3$, $SO_3H$, COOH, $OC_2H_5$ and Br; and $R_4$ containing at least one substituent selected from the group consisting of hydrogen, COOH and $SO_3H$.

2. The dyestuff which in the free acid state corresponds to the formula

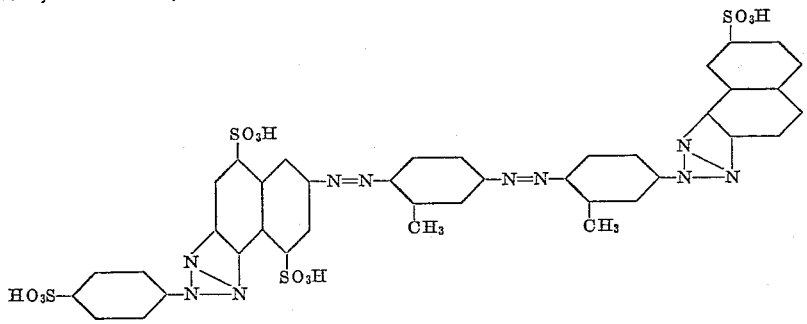

3. The dyestuff which in the free acid state corresponds to the formula

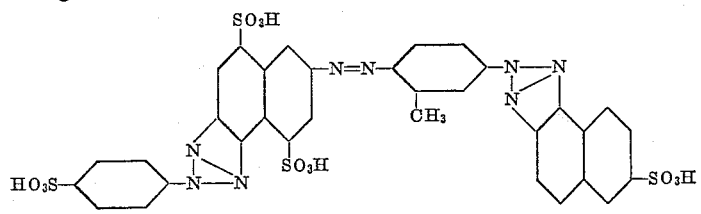

4. The dyestuff which in the free acid state corresponds to the formula

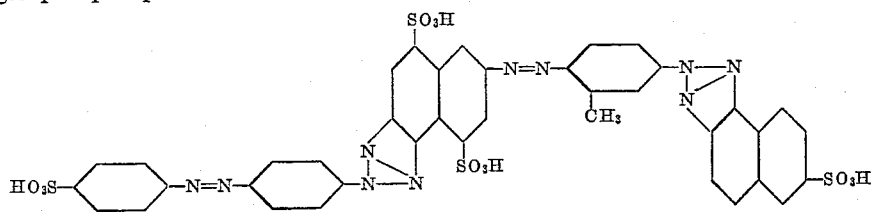

References Cited in the file of this patent
UNITED STATES PATENTS

| | | |
|---|---|---|
| 2,176,521 | Bonhote et al. | Oct. 17, 1939 |
| 2,212,816 | Schultis et al. | Aug. 27, 1940 |
| 2,390,480 | West | Dec. 4, 1945 |
| 2,788,345 | Hanhart | Apr. 9, 1957 |
| 2,795,577 | Feeman | June 11, 1957 |
| 2,817,659 | Bossard et al. | Dec. 24, 1957 |
| 2,932,636 | Suckfull et al. | Apr. 12, 1960 |